3,127,365
ACRYLIC-MODIFIED AMINO POLYAMIDES
Don E. Floyd, Minneapolis, Minn., assignor to General
Mills, Inc., a corporation of Delaware
No Drawing. Filed July 2, 1956, Ser. No. 595,100
4 Claims. (Cl. 260—23)

This invention relates to novel and useful modified amino-polyamides. More specifically, this invention relates to amino-polyamides which have been modified by reaction with acrylic compounds.

The novel reaction products of this invention are useful as casting and potting resins, lamination of fibrous fabrics, sizing for glass fibers, water soluble binders, which have surface active characteristics and as an ingredient in the home permanent type of hair set composition.

Therefore, an object of this invention is to teach a modified amino-polyamide which is water soluble in its salt form.

Another object of this invention is to disclose a method for cross-linking amino-polyamides by the use of polyacrylic compounds.

A still further object of this invention is that it teaches a polymer which has the unique characteristic of being a good binder as well as a surface active agent. It will be appreciated that such compounds may be employed to great advantage in drilling muds.

Other objects and advantages to this invention will become apparent upon reading the subsequent specification.

The novel products of this invention may be prepared by reacting amino-polyamides with various reactive acrylic compounds.

The amino-polyamide resins useful in the above compositions are those in which an excess of a polyamine is reacted with polymeric fat acids to form a polyamide having unreacted amino groups. The amount of these unreacted amino groups can be measured by determining the amine number, the amine number being the number of milligrams of KOH equivalent to the free amine groups in a one gram sample of the resin. Generally speaking, the amino-polyamide resins employed in this invention should have an amine number in the range of 150 to 400 with a preferred range of from 200 to 350.

The polymeric fat acids employed in preparing the amino-polyamide resins are those resulting from the polymerization of drying or semi-drying oils, or their free acids or the simple aliphatic alcohol ester of these acids. Suitable drying or semi-drying oils include soybean, linseed, tung, perilla, cottonseed, corn, sun flower, safflower and dehydrated castor oils. Suitable fatty acids may also be obtained from tall oil, soapstock, and other similar material. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. Thus, the term "polymeric fat acids" as used herein is intended to include the polymerized mixture of acids, which usually contain a predominant portion of dimer acids, a small quantity of trimer and higher polymeric fat acids and some residual monomer.

The polyamines employed to react with the above described polymeric fat acids in the preparation of the amino-polyamide resins have the general formula $$H_2NR(NHR)_pNH_2$$

where R is an alkylene radical and $p$ is a positive integer less than 6. Illustrative polyamines are diethylenetriamine, triethylenetetramine, tetraethylenepentamine, di-1,3-propanetriamine, tri-1,3-propanetriamine, di-1,2-propanetriamine and the like. Thus, the alkylene radical in the above formula is generally ethylene but should not be limited thereto.

It will be seen that in order to obtain an amino-polyamide resin of the type employed in this invention, having unreacted amino radicals, it is necessary to employ polyamines that are at least trifunctional amines since for the most part, at least two amine groups in each molecule will be tied up in the amide linkages. When one of the two amine groups that react to form the amide is a secondary amine, at least one of the terminal primary amines will be free in the form of a branched chain in contrast to a linear amino-polyamide resulting from the reaction of both primary amine groups to form the amide linkages. Under normal conditions the polybasic amine will react with the polymeric fat acids to form a random mixture of branched and linear type linkages.

Active acrylic compounds useful in this invention are those in which the

linkage is part of a conjugated system. Various functional groups such as esters, nitriles, amides, ketones, aldehydes, and carboxyl radicals may be used to form the conjugated system with the ethylenic linkages. These α, β unsaturated compounds may be further illustrated by reference to the following structural formulas.

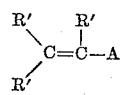

and

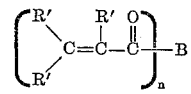

where R' is a hydrogen, aryl, or alkyl radical, A is an activating group selected from the group of —C≡N,

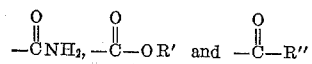

radicals where R' and R" are as above, B is a polyfunctional organic radical such as an alkylene radical and residual amide and ester forming elements of a polyamine or a polyhydric alcohol, respectively, and $n$ is a positive integer less than 6. Illustrative compounds are acrylonitrile, methyl acrylate, ethylene glycol diacrylate, glycerol mono, di, and tri acrylate, acrolein, methylene diacrylamide, methyl vinyl ketone, methyl methacrylate, methyl crotonate, fumaric and maleic acids and their esters, butyl acrylate, acrylamide and N-alkyl substituted acrylamides.

It will be appreciated that various complex reactions take place to produce the novel products of this invention. Some of the mechanisms involved in these reaction as well as the exact configuration of the products is not fully known. However, charts I and II outline the process and type of products encompassed in this invention.

Chart I sets forth the various manipulative steps involved in producing the novel products of this invention.

Chart II illustrates the variety of novel products that may be obtained by this invention starting with two of the possible structures for a dimeric fat acid. It is reiterated, however, that because of the many variations in the specific functional groups that react or do not react in any one polymer, present analytical methods do not permit a determination of the exact chemical structure of one particular polymer. It will also be appreciated that the esters shown in chart I may be saponified with alkali to the sodium or potassium salt to produce a water soluble polymer. Likewise, the various groupings in chart I show the type of random linkages which are present in the reaction products of this invention. The —C≡N groupings of the acrylonitrile modified products may be reduced to generate new amino groups.

CHART I WITH FLOW SHEET

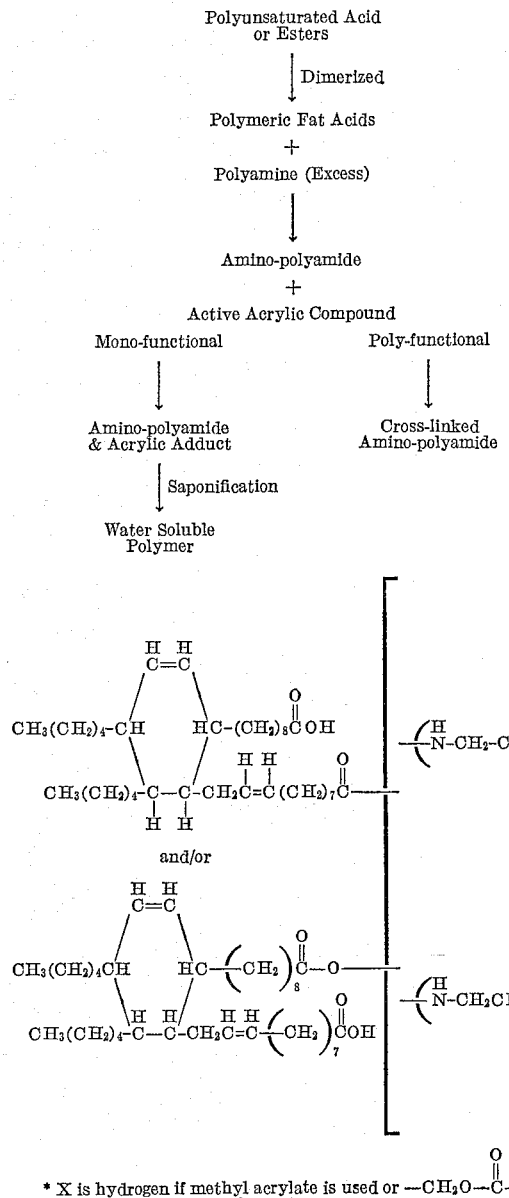

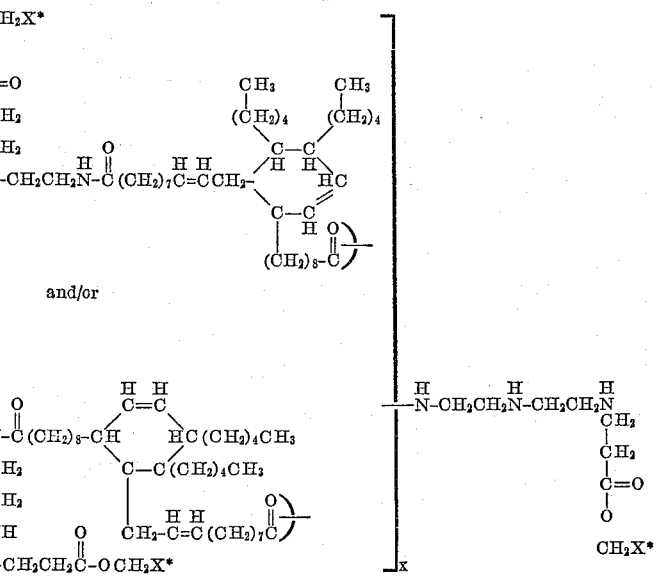

\* X is hydrogen if methyl acrylate is used or —CH₂O—C—CH₂CH₂— in the case of glycol diacrylate which in turn is cross-linked to another amino group in the amino-polyamide.

Although by careful handling, the reactants may be reacted in the absence of a solvent, it is generally preferable to carry out the reaction in the presence of a solvent. Illustrative solvents which may be used are ethanol, isopropanol, n-propanol, butanol, other alcohols or mixtures of alcohols, and aromatic or aliphatic hydrocarbons such as petroleum ether, benzene, xylene, etc.

Likewise the reaction may be conducted at room temperature or elevated temperatures. Of course, it is preferable not to exceed the boiling point of any of the reactants during the reaction period. Thus, the reaction will generally be carried out in the range of 25 to 200° C.

This invention may be further illustrated by reference to the following examples:

Example 1

12.7 g. of an amino-polyamide prepared by reacting polymeric fat acids having a saponification value of about 200 and derived substantially from linoleic acid with triethylene tetramine in the ratio of 1 equivalent of the acid with 2.65 equivalents of amine was dissolved in 99% isopropanol to give a 15% solution. To this solution was added, slowly and with stirring, 4.3 g. of methyl acrylate. The reaction mixture was allowed to stand at room temperature for one day. After the solvent was evaporated off under reduced pressure, the reaction product weighed 16.7 g. Infrared analysis indicated that virtually no new double bonds were present, but that ester groups were now present, which were not found in the original amino-polyamide.

2.7 g. of the adduct from above was heated under reflux for ½ hour with 25 cc. of approximately 0.5 N alcoholic potassium hydroxide solution. The saponified material was precipitated by addition of 125 cc. of toluene. This precipitate, a gel-like material, was soluble in water. Through this modification, a water-insoluble resin was converted into a water-soluble resin.

Example 2

To 1000 g. of a 46% solution of an amino-polyamide as described in Example 1, in 99% isopropanol was added, with agitation, 172 g. of methyl acrylate and the mixture was allowed to stand overnight. Then the solvent was evaporated off under reduced pressure. The residue, containing a small amount of solvent weighed 721.2 g. and had a saponification equivalent of 540.6.

To 711.2 g. of the residue was added a solution of 86.2 g. of 85% potassium hydroxide, the theoretical amount for complete saponification in a mixture of 200 ml. of ethanol and 100 ml. of water. The reaction mixture was refluxed for 3 hours. Then the mixture was washed with toluene. The remaining solution was concentrated under reduced pressure to yield a water soluble, viscous material.

A 1% aqueous solution of this resin had definite wetting characteristics. For example, in the Ross Miles foam test the foam height was 90 mm. (at a pH of 8.5 and 25° C.).

Example 3

A mixture of 50 g. of an amino-polyamide as described in Example 1 and 50 g. of dioctyl maleate was thoroughly mixed together. There was a temperature rise of 7° C. as the material was allowed to stand at room temperature, which indicated an exothermal reaction took place.

Further evidence of the reaction was also found in the fact that the total primary amine content virtually disappeared completely after contact of the amino-polyamide with dioctyl maleate.

*Example 4*

A solution of 127 g. of an amino-polyamide having an amine No. of 220 in 150 ml. of isopropyl alcohol was added to 25 g. (½ equivalent) of acrylonitrile. The solution was allowed to stand for 24 hours at room temperature. Then it was concentrated in vacuo on a steam bath. The residue weighed 150 g. and it had an amine number of approximately 130.

A portion (47 g.) of this product was subjected to hydrogenation in solution in 140 g. of isopropanol. The catalyst was 5 g. of water-wet Raney nickel. Hydrogenation was conducted in the presence of 4 g. of ammonia gas under hydrogen pressure of about 1000 p.s.i. at 250° F. for approximately 6 hours. The catalyst was filtered off, and the solvent removed by distillation under reduced pressure. The residue, a viscous liquid, had the following analysis.

Amine # by HCl titration _____ 182
Amine # by HClO$_4$ titration _____ 212

This indicates the addition of amino groups in the amino-polyamide to acrylonitrile and subsequent reduction of nitrile groups to amino groups took place.

A mixture of 10 grams of this product was thoroughly blended with 15 g. of an epoxy resin prepared from Bisphenol A and epichlorohydrin having an epoxide equivalent of 0.35–0.40/100 g. (Araldite 502). This mixture was cured in an oven at 150° C. for one hour and on cooling to room temperature the product was clear, compatible, hard and tough.

*Example 5*

A blend of 100 g. of an amino-polyamide as described in Example 1 was made with 30 g. of methylene diacrylamide. The blend was warmed at 110–130° C. for about 25 minutes with stirring, and changed from a thin liquid to a rubbery gel.

The product was tested as an adhesive by applying a thin layer between steel strips just before gelation and then heating to gel the product at 110–130° C. for a few minutes.

When the adhered strips were tested by peeling with a load rate of 2 lbs. per minute at a 90° angle at room temperature, it was found in four separate measurements that the following peel strength values were obtained.

| Test No.: | Peel strength (lbs./inch width) |
|---|---|
| 1 | 9.3 |
| 2 | 9.0 |
| 3 | 7.4 |
| 4 | 7.7 |

*Example 6*

A blend of 10 grams of an amino-polyamide of amine number approximately 300 in 10 grams of isopropanol solvent with 5 grams of the diacrylic acid ester of ethylene glycol was prepared at room temperature. Films of this blend were cast on glass plates with a 1.5 mil doctor blade. The films hardened from an original sticky state but did not become completely tack-free on standing overnight.

Other evidence of change or reaction was shown from the fact that the solution blend formed a gel within 30 minutes.

Therefore, many modifications and variations of the invention as hereinbefore set forth may be made without departing from the spirit and scope thereof, and therefore only such limitations should be imposed as are indicated in the appended claims.

Now, therefore, I claim:

1. The novel cross-linked acrylic adducts of an amino polyamide resulting from the addition product of (1) an amino polyamide resin derived from polymeric fat acids and a polyamine of the general formula $$H_2NR(NHR)_pNH_2$$

where R is an alkylene radical and *p* is an integer from 1 to 6 and (2) an alpha-beta unsaturated compound having the structural formula

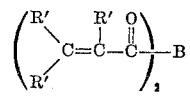

where R' is selected from the group consisting of hydrogen and alkyl radicals and B is selected from the group of nonfunctional organic radicals consisting of

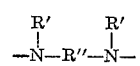

and —O—R"—O— where R" is an alkylene radical and R' is as defined above.

2. The products of claim 1 which have been hydrolyzed in water soluble salts of alkali metals.

3. The adducts defined in claim 1 in which said amino polyamide has an amine number of from 50–400.

4. The adducts defined in claim 1 in which said polyamide is employed in an amount of from 90 to 50 parts by weight and said unsaturated compound is employed in an amount of from 10 to 50 parts by weight.

References Cited in the file of this patent

UNITED STATES PATENTS

| 2,450,940 | Cowan et al. | Oct. 12, 1948 |
| 2,518,148 | Jordan et al. | Aug. 8, 1950 |

FOREIGN PATENTS

| 404,744 | Great Britain | Jan. 25, 1934 |